United States Patent
Okajima et al.

[11] Patent Number: 6,126,243
[45] Date of Patent: Oct. 3, 2000

[54] BICYCLE WHEEL

[75] Inventors: Shinpei Okajima, Izumi; Tsutomu Muraoka, Sakai, both of Japan

[73] Assignee: Shimano, Inc., Osaka, Japan

[21] Appl. No.: 09/222,084

[22] Filed: Dec. 29, 1998

[51] Int. Cl.[7] .................................................. B60B 1/14
[52] U.S. Cl. ............................................. 301/58; 301/104
[58] Field of Search ................................ 301/55, 58, 59, 301/104, 110.5

[56] References Cited

U.S. PATENT DOCUMENTS

| | | | |
|---|---|---|---|
| 365,091 | 6/1887 | Owen | 301/58 |
| 720,048 | 2/1903 | Miller . | |
| 818,175 | 4/1906 | Howi et al. | 301/58 |
| 1,384,128 | 7/1921 | Gase . | |
| 1,483,398 | 2/1924 | Whitehead . | |
| 5,104,199 | 4/1992 | Schlanger | 301/63 |
| 5,452,945 | 9/1995 | Schlanger | 301/58 |
| 5,540,485 | 7/1996 | Enders | 301/104 |

FOREIGN PATENT DOCUMENTS

| | | | |
|---|---|---|---|
| 425730 | 6/1911 | France | 301/58 |
| 47148 | 1/1937 | France | 301/58 |
| 874167 | 4/1942 | France . | |
| 1019285 | 1/1953 | France | 301/58 |
| 2378642 | 8/1978 | France . | |
| 583902 | 8/1933 | Germany . | |
| 155602 | 6/1982 | Germany . | |
| 211318 | 7/1984 | Germany . | |
| 594494 | 6/1959 | Italy | 301/58 |
| 9712 | 4/1898 | United Kingdom . | |
| 416249 | 9/1934 | United Kingdom | 301/58 |
| 854546 | 11/1960 | United Kingdom | 301/58 |

*Primary Examiner*—Russell D Stormer
*Attorney, Agent, or Firm*—Shinjyu Global IP Counselors, LLP

[57] ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of openings for receiving the outer ends of the spokes therein. The openings of the annular rim have reinforcement members or washers located between the spokes and annular rim. The outer ends of the spokes have bent sections located within the spoke holes of the reinforcement members or washers and head section that engage the inner surface of the reinforcement members or washers.

49 Claims, 7 Drawing Sheets

BICYCLE WHEEL

BACKGROUND OF THE INVENTION

1. Field of the Invention

This invention generally relates to a bicycle wheel with a hub adapted to be mounted to a bicycle frame, an annular rim and a plurality of spokes extending inwardly from the rim to the hub. More specifically, the present invention relates to the connection between the spokes and the rim of the bicycle wheel.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

With a spoke constructed in this manner, the nipples are installed in nipple holes formed in either the rim or the hub. The spokes are inserted through holes in either the hub flange or the rim with the flanges of the spokes engaging the areas surrounding the holes in either the hub flange or the rim. The male threads on the ends of the spokes are threaded into the female threads of the spoke nipples installed in the openings of the hub flange or the rim. It is desirable in the bicycle industry to have as few spokes as possible. One problem with conventional spokes is the concentrated stress applied to the rim. Moreover, if fewer spokes are used, the stress on the rim becomes increasingly larger. Typically, conventional spokes are attached to either the inner edge or the lateral side portions of the rim. Thus, the amount of force that can be applied to the rim by the spokes depends mainly upon the thickness of the inner edge of the rim or the lateral side portions of a rim. In order to accommodate the stress from the spokes, the inner edge of the rim can be made thicker. However, making the rim thicker increases the weight of the rim. Moreover, conventional spokes are not very aerodynamic in design.

In view of the above, there exists a need for a bicycle wheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle wheel with a lightweight rim that is relatively durable without adding any thickness to the spoke receiving portion of the rim.

Another object of the present invention is to provide a bicycle wheel, which is lightweight in design.

Another object of the present invention is to provide a bicycle wheel with fewer spokes extending between the rim and the hub.

Another object of the present invention is to provide a bicycle wheel, which can be relatively easy to manufacture by conventional manufacturing techniques.

Still another object of the present invention is to provide a bicycle wheel, which is relatively inexpensive to manufacture in comparison to other performance bicycle wheels.

The foregoing objects can basically be attained by providing a bicycle rim, comprising an outer annular surface, first and second annular spoke attachment portions, an inner annular surface and a plurality of reinforcement members. The outer annular surface is adapted to receive a tire thereon. The first and second annular spoke attachment portions are coupled to the outer annular surface and located radially inwardly of the outer annular surface, the first and second annular spoke attachment portions face in opposite directions with a plurality of circumferentially arranged spoke openings formed therein and a predetermined thickness. The inner annular surface is located radially inwardly of the first and second annular spoke attachment portions and couples the first and second annular spoke attachment portions together. Each of the reinforcement members has a spoke hole located adjacent each of the spoke openings.

The present invention can further be attained by providing a spoked rim assembly, comprising an annular rim, a plurality of inwardly extending spokes and a plurality of reinforcement members. The annular rim has an outer annular surface, first and second annular spoke attachment portions and an inner annular surface. The outer annular surface is adapted to receive a tire thereon. The first and second annular spoke attachment portions are coupled to the outer annular surface and are located radially inwardly of the outer annular surface. The inner annular surface is located radially inwardly of the first and second annular spoke attachment portions and couples the first and second annular spoke attachment portions together. The first and second annular spoke attachment portions face in opposite directions with a plurality of circumferentially arranged spoke openings formed therein and a predetermined thickness. The spokes have an outer end portion at least partially received within one of the openings, a center portion located radially inwardly of the outer end portion, and an inner end portion located radially inwardly of the center portion. Each of the reinforcement members has a spoke hole with the outer portions of the spokes being located in the spoke holes.

The foregoing objects can further be attained by providing a bicycle spoke, comprising an outer end portion, a center portion, an inner end portion, and a reinforcement member. The outer end portion has a bent section that is adapted to be received within an opening of a rim and a head section located at its free end. The center portion is coupled to the outer end portion and located radially inwardly of the outer end portion. The inner end portion is coupled to the center portion and is located radially inwardly of the center portion. The reinforcement member is located on the outer end portion of the spoke.

Also the foregoing objects can further be attained by providing a bicycle wheel assembly, comprising a central portion, a plurality of outwardly extending spokes, an annular rim and a plurality of reinforcement members. The central portion has an axial bore that is adapted to receive a hub assembly therein and a plurality of spoke attachment parts. The spokes have an inner end coupled to the central portion, an outer end, and a middle section located between the inner and outer ends. The annular rim has an outer annular surface that is adapted to receive a tire thereon. The first and second annular spoke attachment portions of the rim are coupled to the outer annular surface and are located radially inwardly of the outer annular surface. An inner annular surface of the rim is located radially inwardly of the first and second annular spoke attachment portions for coupling the first and second annular spoke attachment portions together. The first and second annular spoke attachment portions face in opposite directions with a plurality of circumferentially arranged spoke openings formed therein and a predetermined thickness. The reinforcement members are located on each of the outer end portions.

The foregoing objects can also be attained by providing a spoked rim assembly, comprising an annular rim, a plurality of spokes and a plurality of reinforcement members. The annular rim has an outer annular surface adapted to receive a tire thereon. The annular rim also has first and second annular spoke attachment portions that are coupled to the outer annular surface and located radially inwardly of the outer annular surface. The inner annular surface is located radially inwardly of the first and second annular spoke attachment portions and couples the first and second annular spoke attachment portions together. The outer annular surface has a plurality of circumferentially spaced access apertures with first predetermined widths. The first and second annular spoke attachment portions face in opposite directions. Circumferentially arranged spoke openings are formed on the first and second annular spoke attachment portions. The spoke openings have second predetermined widths that are smaller than the first widths of the access apertures. The spokes have an outer end portion, a center portion and an inner end portion, an outer end portion at least partially received within one of the openings. The center portion is located radially inwardly of said outer end portion. The outer end portions of the spokes have enlarged head members. Each of the reinforcement members has a spoke hole with an outer portion of one of the spokes being located in the spoke hole. The first widths of said access apertures are sized to allow the spokes with the reinforcement members positioned on the outer end portions to pass therethrough while the center portions are located in the spoke openings.

The foregoing objects can further be attained by providing a reinforcement member adapted to be positioned between a spoke and a rim. The rim has an outer annular surface, first and second annular spoke attachment portions coupled to the outer annular surface and located radially inwardly of the outer annular surface and an inner annular surface located radially inwardly of the first and second annular spoke attachment portions and coupling the first and second annular spoke attachment portions together. The reinforcement member has a first portion, a second portion and a spoke hole. The first portion of the reinforcement member has a first maximum circumferential width that is adapted to be received in a spoke opening of the rim. The second first portion of the reinforcement member has a second maximum circumferential width that is larger than the first maximum circumferential width. The spoke hole extends through the first and second portions. The spoke hole is sized to receive a portion of the spoke therein.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
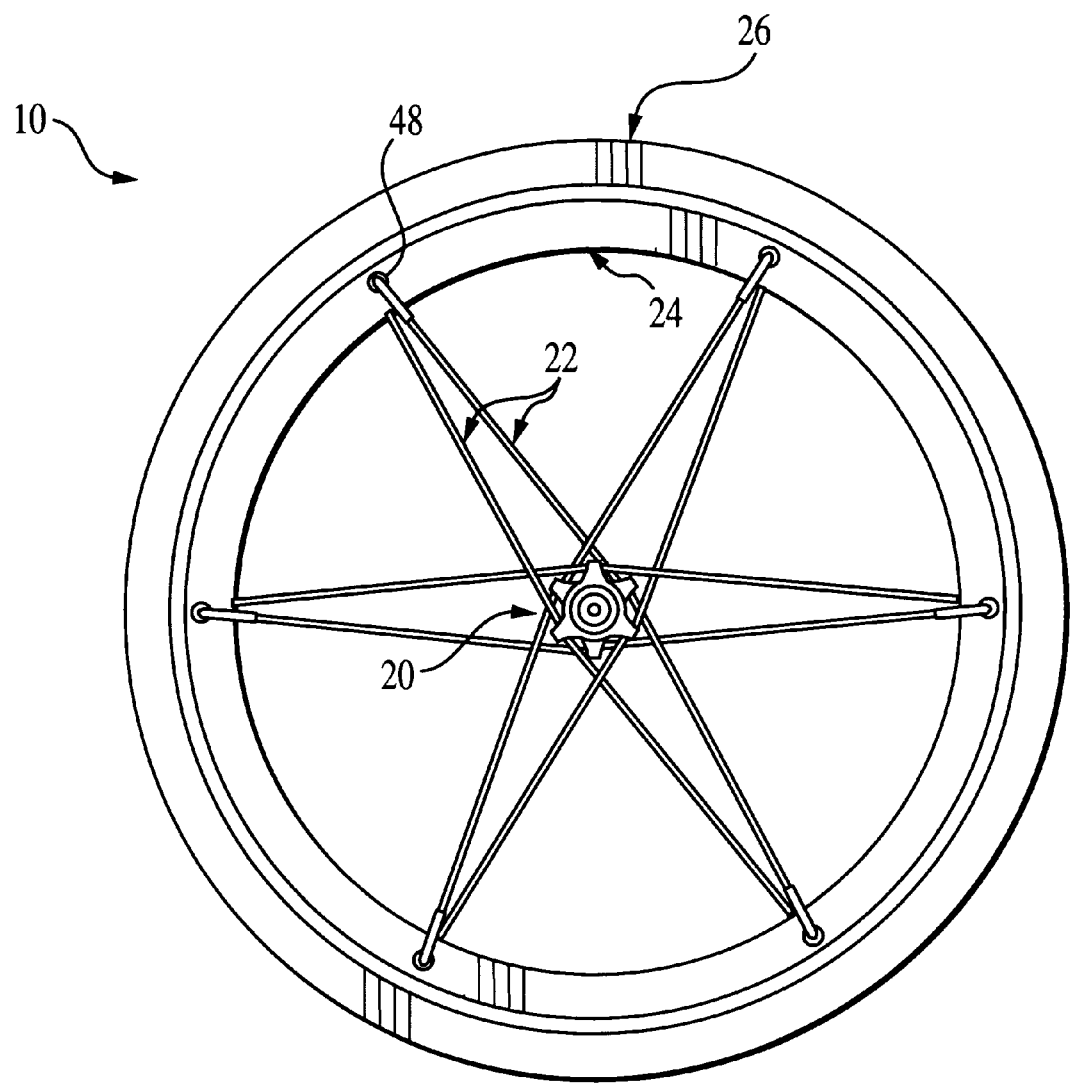
FIG. 1 is a side elevational view of a bicycle wheel with a front hub, twelve spokes and a rim in accordance with a first embodiment of the present invention.
Figure 2:
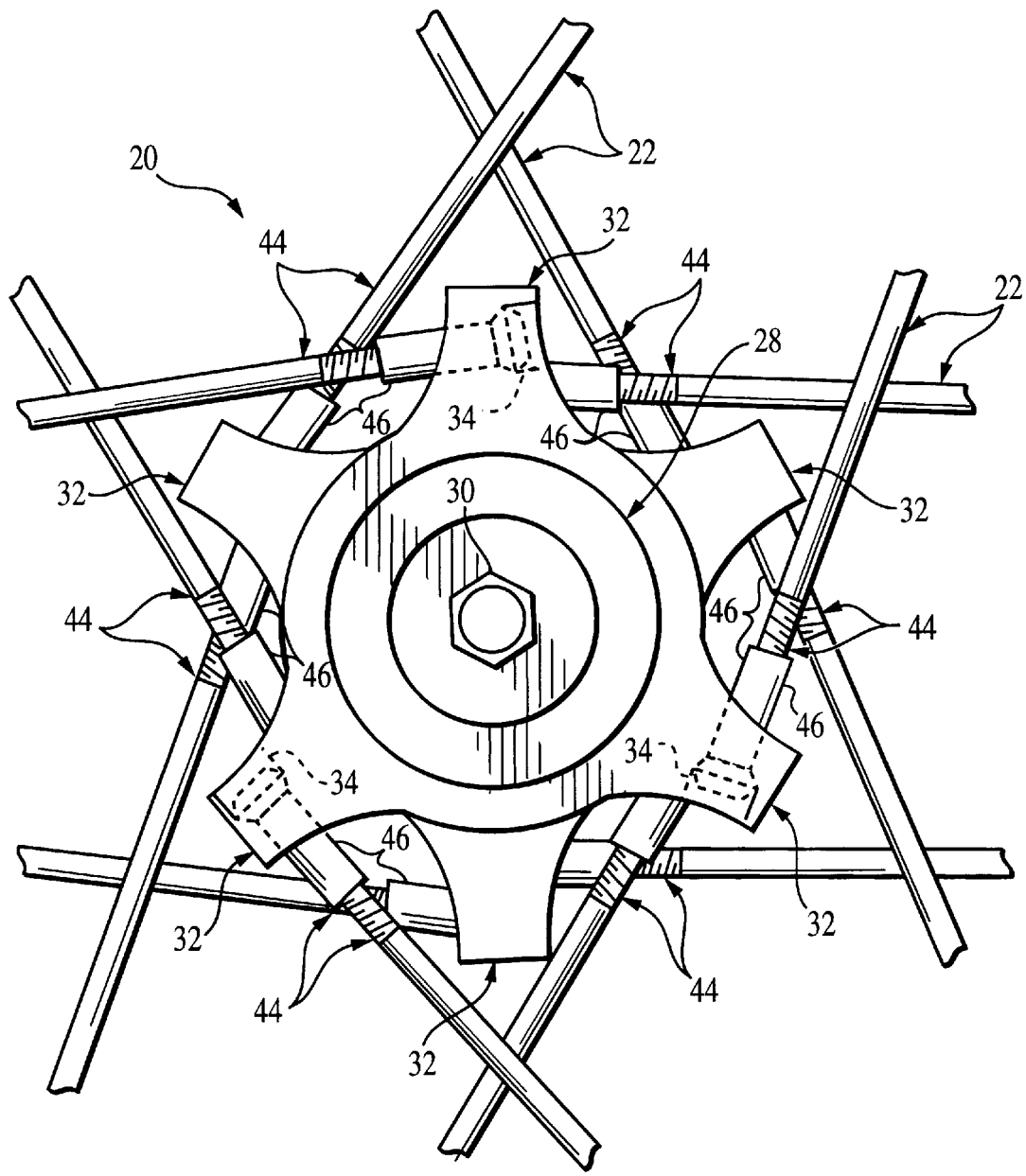
FIG. 2 is an enlarged elevational view of the front bicycle hub illustrated in FIG. 1 with the inner end portions of the spokes coupled thereto.

Referring initially to FIGS. 1 and 2, a bicycle wheel 12 in accordance with the present invention is illustrated in accordance with the present invention. Bicycle wheel 12 can be utilized as either a front bicycle wheel or a rear bicycle wheel. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub 20, a plurality of outwardly extending spokes 22 and an annular rim portion 24 with a pneumatic tire 26 coupled thereto in a conventional manner. In the illustrated embodiment shown herein, bicycle wheel 12 has twelve spokes 22 extending radially between central hub 20 and annular rim portion 24. Of course, it will be apparent to those skilled in the art from this disclosure that the bicycle wheel 12 can have fewer or more spokes 22 than illustrated if needed and/or desired.

Hub 20 has a tubular body section with six spoke attachment points 32 with holes 34 for coupling spokes 22 thereto. Tubular body section 30 has an axial bore that is adapted to receive a hub assembly 28 therein.

The number and shape of the spoke attachment points 32 will depend upon the number of spokes and their shapes. Accordingly, it will be apparent to those skilled in the art from this disclosure that other types and shapes of hubs can be utilized in connection with the present invention.

Figure 3:
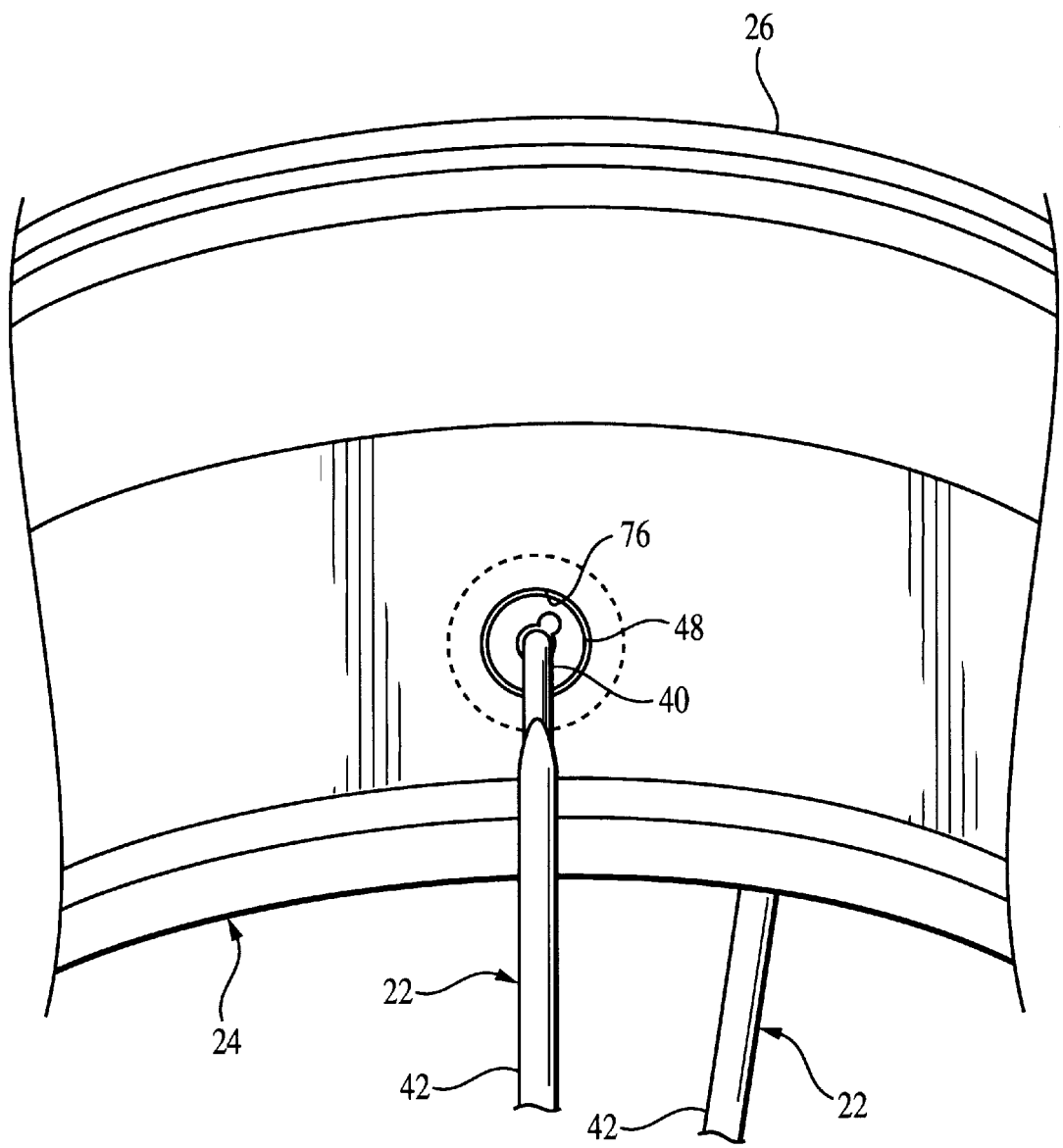
FIG. 3 is an enlarged, partial side elevational view of a portion of the front bicycle wheel illustrating the connection between the rim and two of the spokes of the bicycle wheel illustrated in FIG. 1.
Figure 4:
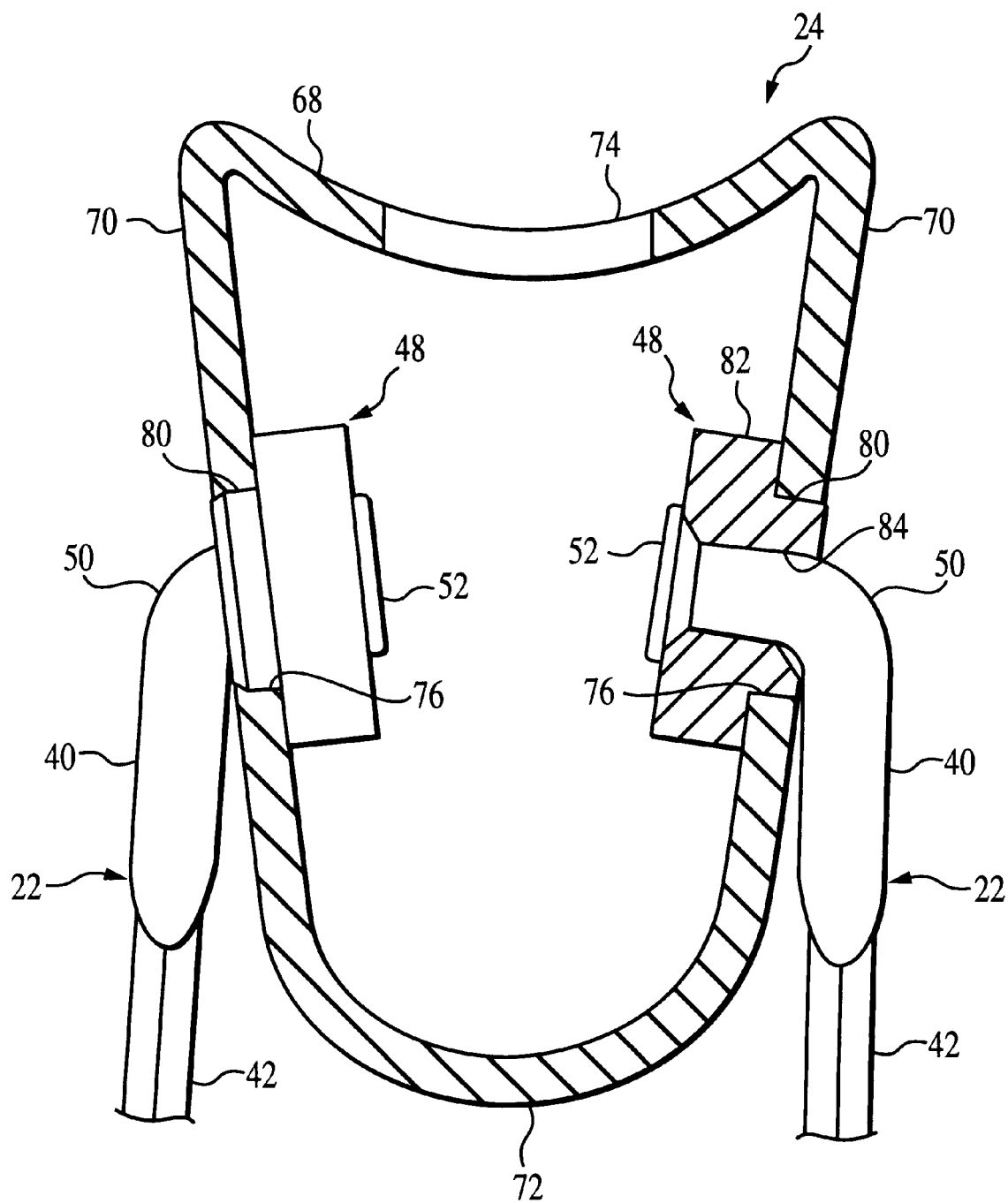
FIG. 4 is a partial, cross-sectional view of the bicycle rim as seen along section line 4—4 of FIG. 3 with one of the reinforcement members of the bicycle wheel illustrated in elevation and the other illustrated in cross-section.
Figure 5:
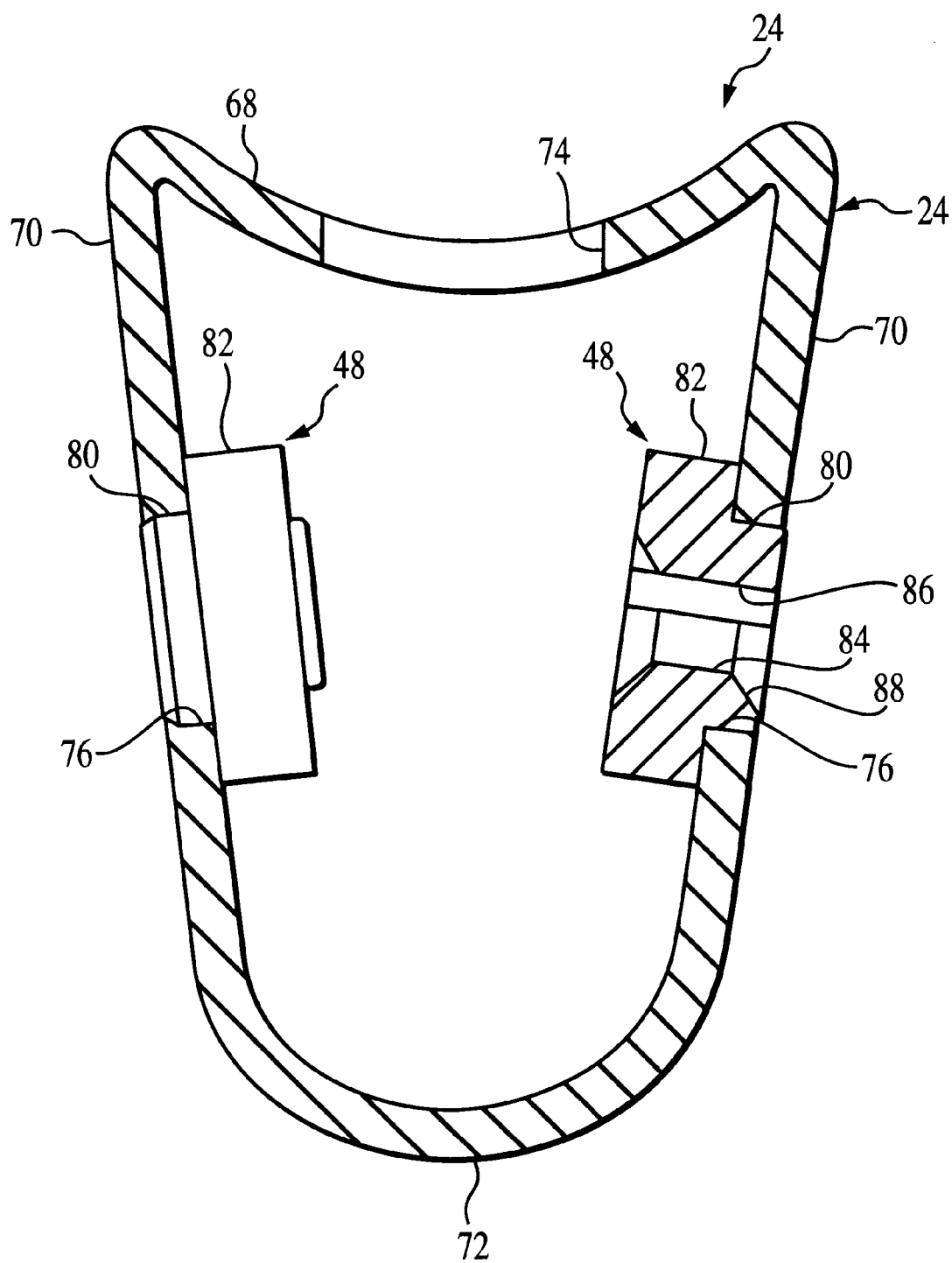
FIG. 5 is a partial, cross-sectional view of the bicycle rim as seen along section line 4—4 of FIG. 3 with the spokes of the bicycle wheel removed for purposes of illustration.

As seen in FIGS. 2–4, each of the spokes 22 has an outer end portion 40, a center or middle portion 42 and an inner end portion 44. Outer end portions or spoke heads 40 are coupled to rim 24 by reinforcement members or washers 48 as discussed below. Reinforcement members or washers 48 are designed to disperse the stresses applied to rim 24 by spokes 22.

Straight center portion 42 is located radially inwardly of outer end portion 40, and inner end portion 44 located radially inwardly of the center portion 42. Center portion 42 is coupled to hub 20 in a relatively conventional manner. Preferably, outer end portion 40, center portion 42 and inner end portion 44 are constructed as a unitary, one-piece member with spoke nipples 46 theadedly coupled to the inner end portion 44 of each of the spokes 22 for connection to hub 20.

In this embodiment, outer end portions 40 of spokes 22 have a bent section 50 with an enlarged head 52 at the free end of bent section 50. Bent section 50 has a circular cross-section of a predetermined width or diameter. The head 52 has a larger width or diameter to secure spoke 22 to rim 24 via reinforcement member or washer 48. Center portions 42 and inner end portions 44 each have a circular or elliptical cross section. Of course, it will be apparent to those skilled in the art that the entire length of spokes 22a can be substantially uniform along its entire cross section if needed and/or desired. It will also be apparent to those skilled in the art that constant cross section spokes can be utilized or spokes with a varying cross section can be utilized as needed and/or desired.

Figure 6:
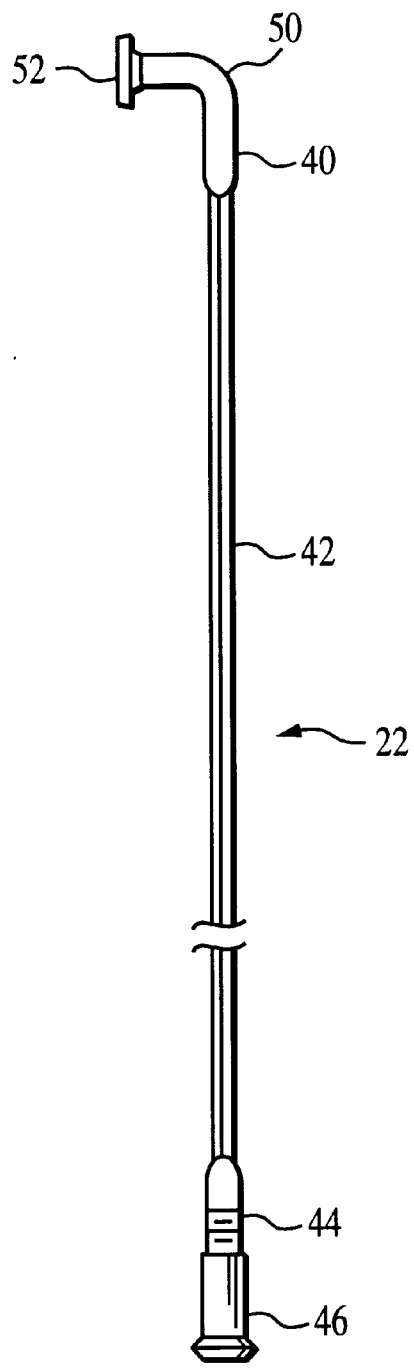
FIG. 6 is an enlarged, partial side elevational view of one of the spokes illustrated in FIGS. 1–4 in accordance with the present invention.
Figure 7:
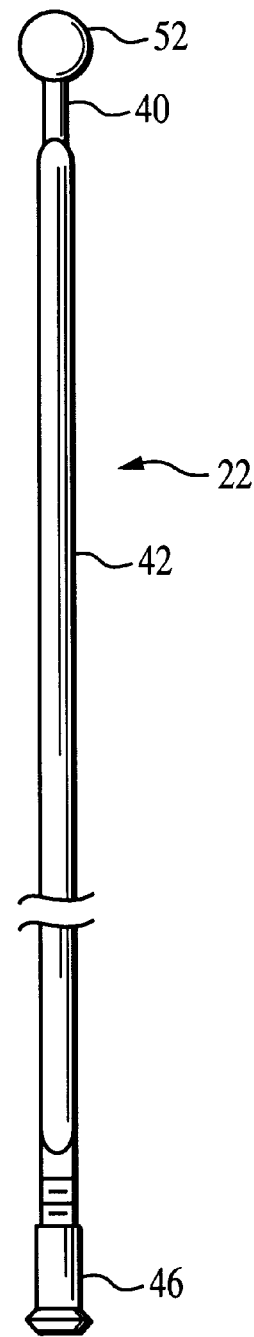
FIG. 7 is an enlarged, partial edge elevational view of the spoke illustrated in FIGS. 6 in accordance with the present invention.
Figure 8:
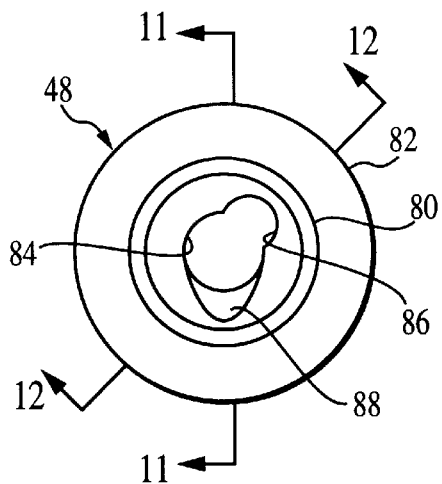
FIG. 8 is an enlarged right side elevational view of one of the reinforcement members or washers in accordance with the present invention.
Figure 9:
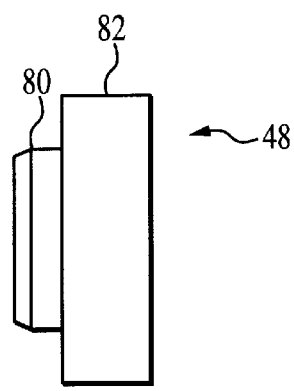
FIG. 9 is an enlarged edge elevational view of the reinforcement member or washer illustrated FIG. 8.
Figure 10:
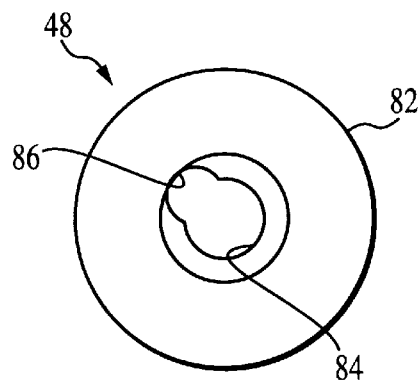
FIG. 10 is an enlarged left side elevational view of the reinforcement member or washer ustrated in FIGS. 8 and 9.
Figure 11:
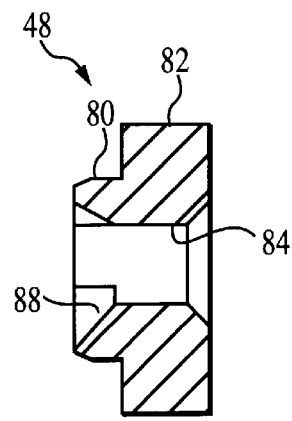
FIG. 11 is a longitudinal cross-sectional view of the reinforcement member or washer illustrated in FIGS. 8–10 as seen along section line 11—11 of FIG. 8.
Figure 12:
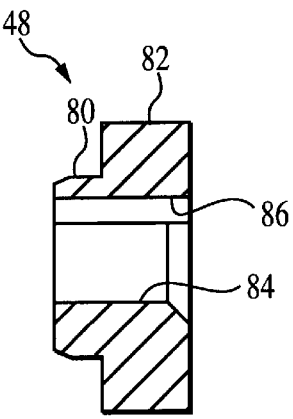
FIG. 12 is a longitudinal cross-sectional view of the reinforcement member or washer illustrated in FIGS. 8–11 as seen along section line 12—12 of FIG. 8.

As seen in FIGS. 4, 6 and 7, outer end portions 40 of spokes 22 are bent to form heads 52 at the free ends of spokes 22 which are offset from the bent sections 50. Of course, it will be apparent to those skilled in the art from this disclosure that outer end portions 40 can be bent or formed to have a different shape and/or cross section than the illustrated shapes and cross sections. In any event, the shapes and cross sections of bent section 50 and head 52 of each spoke should be configured to prevent axial movement of the spoke relative to rim 24 when the spoke is in the installed position.

Center portions 42 of spokes 22 are illustrated as being substantially straight wire type spokes with substantially elliptical cross sections. However, it will be apparent to those skilled in the art from this disclosure that center portions 42 of spokes 22 can be configured to have other types of cross sections and/or shapes. For example, center portions 42 can be circular or more rectangular in cross section with the shape being uniformed along the entire length of center portion 42. Alternatively, the cross section of center portion 42 can vary along its length such that the cross section of center portion 42 becomes wider as it approaches hub 20. In other words, the thickness and/or width of center portion 42 can be either uniformed or varied as needed and/or desired.

Inner end portions 44 of spokes 22 are threaded for receiving conventional spoke nipples 46 thereon. More specifically, inner end portions 44 of spokes 22 are inserted through one end of bores 34 of hub 20, and then spoke nipples 46 are inserted through the other end of bores 34. The headed or flanged portion of the spoke nipples 46 engage an internal abutment surface of bores 34 to fixedly secure inner end portions 44 of spokes 22 to hub 20. Accordingly, spokes 22 can be tightened in a substantially conventional manner between hub 20 and rim 24 to secure inner end portions 44 of spokes 22 thereto.

Rim 24 is a so-called deep rim in which the rim height is greater than the rim width and is designed to have pneumatic tire 26 fastened thereto by a tire cement. It will be apparent to those skilled in the art that the shape of rim 24 could be modified to accommodate different types of tires such as "clinchers" as needed and/or desired. Of course, rim 24 can have other shapes to accommodate other types of tires as needed and/or desired without departing from the scope of the present invention. Rim 24 is constructed of a substantially rigid material, such as those materials, which are well known in the art. For example, rims 24 can be constructed of any suitable metallic material, such as plated steel, stainless steel, aluminum, magnesium or titanium, as well as other non-metallic materials, such as a carbon fiber composite, which can be utilized for a bicycle wheel.

Rim 24 is substantially circular as seen in side elevation (FIG. 1), and has an outer annular surface 68, a pair of annular spoke attachment portions 70 and an inner annular surface 72. The outer annular surface 68 is adapted to receive pneumatic tire 26 thereon. Outer annular surface 68 of rim 24 has a plurality of access apertures 74 for inserting spokes 22 therethrough and into spoke openings 76 of annular spoke attachment portions 70.

The annular spoke attachment portions 70 are located radially inward of outer annular surface 68, as seen in FIG. 4, with inner annular surface 72 connecting annular spoke attachment portions 70 together. Rim 24 is a tubular member with a hollow, annular inner area. In the preferred embodiment, outer annular surface 68 of rim 24 is designed for use with "tubular" or "sew-up" type tires which are cemented to outer annular surface 68.

Spoke attachment portions 70 are located radially inwardly relative to outer annular surface 68 of the rim 24. Each spoke attachment portion 70 has a plurality of circumferentially spaced spoke openings 76 for receiving spokes 22 with reinforcement members or washers 48 therein. Reinforcement members or washers 48 are designed to disperse the stresses applied to rim 24 by spokes 22.

Spoke openings 76 are preferably equally spaced about the circumference of spoke attachment portions 70. In this embodiment, the plurality of spoke openings 76 are preferably circular openings that are larger than the outer end portions 40 of the spokes 22 therein. Spoke openings 76 of the present invention are larger than conventional spoke openings. Therefore, reinforcement members or washers 48 distribute the forces on rim 24 over a greater area than ordinary round spokes such that stress fracturing and/or tearing of rim 24 is minimized. Preferably, openings 76 have circumferential widths or diameters of at least approximately 5.0 millimeters. Each spoke opening 76 is located adjacent one of the access apertures 74 so that a spoke 22 with a reinforcement member 48 can be inserted through access aperture 74 and into spoke opening 76. Access apertures 74 are preferably circular openings with a width or diameter of approximately 9.0 millimeters or larger. In any event, the width or diameter of access apertures 74 should be at least the width or diameter of reinforcement members 48, e.g., at least approximately 8.0 millimeters.

Referring to FIGS. 5 and 8–11, reinforcement members or washers 48 will now be discussed in more detail. Reinforcement members or washers 48 are designed to disperse the stresses applied to rim 24 by spokes 22. Reinforcement members or washers 48 are preferably disk shaped members with each reinforcement members or washers 48 having a first (smaller) circular stepped portion 80, a second (larger) circular stepped portion 82 and a centrally located spoke hole 84. Preferably, reinforcement members or washers 48 are constructed as one-piece, unitary member. An example of one suitable material for reinforcement members or washers 48 is aluminum alloy. Of course, other materials can be used. Moreover, reinforcement members or washers 48 can be made of the same material as rim 24 or a different material from rim 24. It will be readily apparent to those skilled in the art from this disclosure that reinforcement members or washers 48 do not have to be stepped as illustrated, but can have other shapes that can carry out the advantages of the present invention.

Preferably, reinforcement members or washers 48 have an axial thickness of approximately 3.7 millimeters. The diameter or width of first (smaller) circular stepped portion 80 is approximately 5.0 millimeters, while the diameter or width of second (larger) circular stepped portion 82 is approximately 8.0 millimeters. The diameters or widths of stepped portions 80 and 82 should be as large as reasonably possible to disperse the stresses on rim 24 from spokes 22. In other words, it is better for the diameters or widths of stepped portions 80 and 82 to be as large as reasonably possible. The axial thickness of first (smaller) circular stepped portion 80 is approximately 1.4 millimeters, while the diameter or width of second (larger) circular stepped portion 82 is approximately 2.3 millimeters. The word approximately as used herein means ±0.1 millimeters.

It will be readily apparent to those skilled in the art from this disclosure that reinforcement members or washers 48 can be made thicker than the thickness of spoke attachment portion 72, or can be the same thickness as the thickness of spoke attachment portion 72.

First circular stepped portion 80 of each reinforcement members or washers 48 can be frictionally retained with in one of the spoke openings 76 of rim 24. Since spokes 22 are placed under tension between hub 20 and rim 24, spokes 22 apply an inward radial force at circumferentially spaced locations that correspond to spoke openings 76. Reinforcement members or washers 48 disperse the stresses on rim 24 from spokes 22. Specifically, first circular stepped portion 80 of each reinforcement members or washers 48 increases the effective diameter or width of spoke 22 to spread out the stresses on the rim 24. Accordingly, the strength of rim 24 is increased without adding thickness to the wall of spoke attachment portion 72.

Spoke holes 84 of reinforcement washers 48 are designed so that spokes 22 can freely pass therethrough. In the illustrated embodiment, the center portions 42 of spokes 22 are elliptical in cross-section. Accordingly, spoke holes 84 have longitudinally extending slots 86 that increase the effective diameter of width of spoke holes 84 to allow the center portions 42 of spokes 22 to pass therethrough.

A slanted cutout or notch 88 is formed on the axial face of first step portion 80. This notch 88 accommodates the bent section 50 of the outer end portion of spoke 22. Preferably, notch 88 is located approximately 135° from slot 86. Thus, when bent section 50 of spoke 22 is seated in notch 88, movement of spoke 22 in spoke hole 84 is limited.

In assembling bicycle wheel 12, reinforcement members 48 are first placed on the outer end portions 40 of spokes 22. Specifically, the inner end portions 44 of spokes 22 are first inserted into spoke holes 84 of reinforcement members or washers 48. Then, the spokes 22 are rotated so that the longer width portion of the elliptical center portions 42 are aligned with slots 86 such that the center portions 42 of spokes 22 can pass through spoke holes 84 of reinforcement members or washers 48. Once the center portions 42 of spokes 22 have passed through spoke holes 84 of reinforcement members or washers 48, the spokes 22 can be further rotated within spoke holes 84 such that the bent section 50 of the spokes 22 are seated in notches 88 and heads 52 of spokes 22 engage the axial surface of second step portion 82 of reinforcement members or washers 48.

Now, the spokes 22 with reinforcement members or washers 48 thereon can be installed into rim 24. The spokes 22 with reinforcement members or washers 48 are inserted through the access apertures 74 in the outer surface of rim 24 at an angle such that the inner end portions 44 of spokes 22 pass through spoke openings 76. Obviously, access apertures 74 of rim 24 must be sufficiently large in width to accommodate both the spoke 22 and the reinforcement member or washer 48 installed thereon. Once the spokes 22 and washers 48 have fully entered the interior of rim 24, the first stepped portions 80 of reinforcement washers 48 are seated in the spoke openings 76 of rim 24. Preferably, spoke openings 76 are slightly larger than the diameter width of stepped portion 80 such that washers 48 are either loosely received within openings 76 or securely received via interference fit.

Now, the inner end portions 44 of spokes 22 are inserted into openings 34 of hub 20. Spoke nipples or nuts 46 are also inserted into openings 34 and threaded onto the inner end portions 44 of spokes 22. The tension in spokes 22 is then adjusted such that rim 24 is properly positioned about hub 20. The wheel 12 can now be installed on a frame of a bicycle in a conventional manner via hub 20.

While only one embodiment has been chosen to illustrate the present invention, it will be readily apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle wheel assembly, comprising:
   a central portion adapted to be coupled to a bicycle frame, said central portion having a plurality of spoke attachment parts;
   a plurality of outwardly extending spokes with each of said spokes having an inner end portion coupled to said central portion, an outer end portion, and a center portion located between said inner and outer end portions, each of said outer end portions of said spokes having a bent section with an enlarged head member formed at a free end of said bent section;

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein; and a plurality of reinforcement members with each of said reinforcement members having a first surface, a second surface and a spoke hole extending between said first and second surfaces, said bent sections of said outer end portions of said spokes being located in said spoke holes with said enlarged head members engaging said first surfaces and said second surfaces of said reinforcement members engaging an interior surface of said rim.

2. A bicycle wheel assembly according to claim 1, wherein said reinforcement members have a first portion with a first circumferential width and a second portion with a second circumferential width that is larger than said first circumferential width, said first portions being located within said spoke openings of said annular rim.

3. A bicycle wheel assembly according to claim 2, wherein said first portions of said reinforcement members have a substantially cylindrical outer surface, and said spoke openings of said first and second annular spoke attachment portions are substantially circular.

4. A bicycle wheel assembly according to claim 3, wherein said second portions of said reinforcement members have a substantially cylindrical outer surface.

5. A bicycle wheel assembly according to claim 2, wherein said first and second annular spoke attachment portions have a predetermined wall thickness and said first portions have an axial thickness that is greater than said predetermined wall thicknesses of said first and second annular spoke attachment portions.

6. A bicycle wheel assembly according to claim 1, wherein said outer annular surface of said annular rim has a plurality of circumferentially spaced access apertures with first predetermined widths, said spoke openings have second predetermined widths that are smaller than said first widths of said access apertures, said first widths of said access apertures being sized to allow said spokes with said reinforcement members positioned on said outer end portions to pass therethrough while said center portions are located in said spoke openings.

7. A bicycle wheel assembly according to claim 1, wherein said outer end portions of said spokes have first maximum circumferential widths, and said spoke openings have second maximum circumferential widths that are at least 1.5 times as large as said first maximum circumferential widths of said spokes.

8. A bicycle wheel assembly according to claim 1, wherein said reinforcement members are constructed of a metallic material.

9. A bicycle wheel assembly, comprising:

a central portion adapted to be coupled to a bicycle frame, said central portion having a plurality of spoke attachment parts;

a plurality of outwardly extending spokes with each of said spokes having an inner end portion coupled to said central portion, an outer end portion, and a center portion located between said inner and outer end portions, each of said outer end portions of said spokes having an enlarged head member;

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein; and a plurality of reinforcement members being at least partially received in said spoke openings, each of said reinforcement members having a spoke hole, said outer end portions of said spokes being located in said spoke holes, said spoke holes of said reinforcement members being non-circular in transverse cross section.

10. A bicycle wheel assembly, comprising:

a central portion adapted to be coupled to a bicycle frame, said central portion having a plurality of spoke attachment parts;

a plurality of outwardly extending spokes with each of said spokes having an inner end portion coupled to said central portion, an outer end portion, and a center portion located between said inner and outer end portions, each of said outer end portions of said spokes having an enlarged head member, said enlarged head members of said outer end portions of said spokes having first maximum circumferential widths;

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein, said spoke openings having second maximum circumferential widths that are no smaller than said first maximum circumferential widths; and a plurality of reinforcement members being at least partially received in said spoke openings, each of said reinforcement members having a spoke hole, said outer end portions of said spokes being located in said spoke holes.

11. A rim and spoke assembly, comprising:

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein and a predetermined thickness;

a plurality of inwardly extending spokes with each of said spokes having an outer end portion, a center portion located radially inwardly of said outer end portion, and an inner end portion located radially inwardly of said center portion, each of said outer end portions of said spokes having a bent section with an enlarged head member formed at a free end of said bent section; and a plurality of reinforcement members with each of said reinforcement members having a first surface, a second surface and a spoke hole extending between said first and second surfaces, said bent sections of said outer end portions of said spokes being located in said spoke holes with said enlarged head members engaging said first surfaces and said second surfaces of said reinforcement members engaging an interior surface of said rim.

12. A rim and spoke assembly according to claim 11, wherein said reinforcement members have a first portion with a first maximum circumferential width and a second portion with a second maximum circumferential width that is larger than said first maximum circumferential width, said first portions being located within said spoke openings of said annular rim.

13. A rim and spoke assembly according to claim 12, wherein said first and second annular spoke attachment portions have a predetermined wall thickness and said first portions have an axial thickness that is greater than said predetermined wall thicknesses of said first and second annular spoke attachment portions.

14. A rim and spoke assembly according to claim 12, wherein said first portions of said reinforcement members have a substantially cylindrical outer surface, and said openings of said first and second annular spoke attachment portions are substantially circular.

15. A rim and spoke assembly according to claim 14, wherein said second portions of said reinforcement members have a substantially cylindrical outer surface.

16. A rim and spoke assembly according to claim 11, wherein said outer annular surface of said annular rim has a plurality of circumferentially spaced access apertures with first predetermined maximum widths, said spoke openings have second predetermined maximum widths that are smaller than said first maximum widths of said access apertures, said first maximum widths of said access apertures being sized to allow said spokes with said reinforcement members positioned on said outer end portions to pass therethrough while said center portions are located in said spoke openings.

17. A rim and spoke assembly according to claim 11, wherein said outer end portions of said spokes have first maximum circumferential widths, and said spoke openings have second maximum circumferential widths that are at least 1.5 times as large as said first maximum circumferential widths of said spokes.

18. A rim and spoke assembly according to claim 11, wherein said reinforcement members are constructed of a metallic material.

19. A rim and spoke assembly, comprising:

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein and a predetermined thickness;

a plurality of inwardly extending spokes with each of said spokes having an outer end portion at least partially received within one of said openings, a center portion located radially inwardly of said outer end portion, and an inner end portion located radially inwardly of said center portion, each of said outer end portions of said spokes having an enlarged head member; and a plurality of reinforcement members with each of said reinforcement members having a spoke hole, said outer end portions of said spokes being located in said spoke holes, said spoke holes of said reinforcement members being non-circular in transverse cross section.

20. A rim and spoke assembly, comprising:

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said first and second annular spoke attachment portions face in opposite directions with a plurality of circumferentially arranged spoke openings formed therein and a predetermined thickness;

a plurality of inwardly extending spokes with each of said spokes having an outer end portion at least partially received within one of said openings, a center portion located radially inwardly of said outer end portion, and an inner end portion located radially inwardly of said center portion, each of said outer end portions of said spokes having an enlarged head member; and a plurality of reinforcement members with each of said reinforcement members having a spoke hole, said outer end portions of said spokes being located in said spoke holes;

said enlarged head members of said outer end portions of said spokes having first maximum circumferential widths, and said spoke openings having second maximum circumferential widths that are no smaller than said first maximum circumferential widths.

21. A rim and spoke assembly, comprising:

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said outer annular surface having a plurality of circumferentially spaced access apertures with first predetermined widths, said first and second annular spoke attachment portions face in opposite directions with a plurality of circumferentially arranged spoke openings formed therein with second predetermined widths that are smaller than said first widths of said access apertures;

a plurality of inwardly extending spokes with each of said spokes having an outer end portion, a center portion located radially inwardly of said outer end portion, and an inner end portion located radially inwardly of said center portion, each of said outer end portions of said spokes having a bent section with an enlarged head member formed at a free end of said bent section; and a plurality of reinforcement members with each of said reinforcement members having a first surface, a second surface and a spoke hole extending between said first and second surfaces, said bent sections of said outer portions of said spokes being located in said spoke holes with said enlarged head members engaging said first surfaces and said second surfaces of said reinforcement members engaging an interior surface of said rim;

said first widths of said access apertures being sized to allow said spokes with said reinforcement members positioned on said outer end portions to pass therethrough while said center portions are located in said spoke openings.

22. A rim and spoke assembly according to claim 21, wherein said reinforcement members have a first portion with a first maximum circumferential width and a second portion with a second maximum circumferential width that is larger than said first maximum circumferential width, said first portions being located within said spoke openings of said annular rim.

23. A rim and spoke assembly according to claim 22, wherein said first and second annular spoke attachment portions have a predetermined wall thickness and said first portions have an axial thickness that is greater than said predetermined wall thicknesses of said first and second annular spoke attachment portions.

24. A rim and spoke assembly according to claim 22, wherein said first portions of said reinforcement members have a substantially cylindrical outer surface, and said openings of said first and second annular spoke attachment portions are substantially circular.

25. A rim and spoke assembly according to claim 24, wherein said second portions of said reinforcement members have a substantially cylindrical outer surface.

26. A rim and spoke assembly according to claim 22, wherein each of said first portions of said reinforcement members has a radial notch adjacent said spoke holes.

27. A rim and spoke assembly according to claim 21, wherein said spoke holes of said reinforcement members are non-circular in transverse cross section.

28. A rim and spoke assembly according to claim 21, wherein said outer end portions of said spokes have first maximum circumferential widths, and said spoke openings have second maximum circumferential widths that are at least 1.5 times as large as said first maximum circumferential widths of said spokes.

29. A rim and spoke assembly according to claim 21, wherein said reinforcement members are constructed of a metallic material.

30. A rim and spoke assembly, comprising:

an annular rim having an outer annular surface adapted to receive a tire thereon, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, said outer annular surface having a plurality of circumferentially spaced access apertures with first predetermined widths, said first and second annular spoke attachment portions face in opposite directions with a plurality of circumferentially arranged spoke openings formed therein with second predetermined widths that are smaller than said first widths of said access apertures;

a plurality of inwardly extending spokes with each of said spokes having an outer end portion at least partially received within one of said openings, a center portion located radially inwardly of said outer end portion, and an inner end portion located radially inwardly of said center portion, each of said outer end portions of said spokes having an enlarged head member; and a plurality of reinforcement members with each of said reinforcement members having a spoke hole, said outer end portions of said spokes being located in said spoke holes;

said first widths of said access apertures being sized to allow said spokes with said reinforcement members positioned on said outer end portions to pass therethrough while said center portions are located in said spoke openings;

said enlarged head members of said outer end portions of said spokes having first maximum circumferential widths, and said spoke openings having second maximum circumferential widths that are no smaller than said first maximum circumferential widths.

31. A bicycle rim, comprising:

an outer annular surface adapted to receive a tire thereon, said outer annular surface having a plurality of circumferentially spaced access apertures with first predetermined widths;

first and second annular spoke attachment portions coupled to said outer annular surface and extending radially inwardly of said outer annular surface, said first and second annular spoke attachment portions face in opposite directions and are substantially parallel with a plurality of circumferentially arranged spoke openings formed therein with second predetermined widths that are smaller than said first widths of said access apertures, said first widths of said access apertures being sized to allow a spoke with a reinforcement member positioned on its outer end to pass therethrough while said center portions are located in said spoke openings; and an inner annular surface located radially inwardly of said first and second annular spoke attachment portions and coupling said first and second annular spoke attachment portions together.

32. A bicycle rim-according to claim 31, wherein
said spoke openings of said first and second annular spoke attachment portions are substantially circular.

33. A bicycle rim according to claim 32, wherein
said access apertures are substantially circular.

34. A bicycle rim according to claim 33, wherein
said access apertures have circumferential widths of at least approximately 8.0 millimeters.

35. A bicycle rim-according to claim 31, wherein
said spoke openings of said first and second annular spoke attachment portions have circumferential widths of at least approximately 5.0 millimeters.

36. A bicycle spoke assembly, comprising:
a first end having a bent section adapted to be received within an opening of a hollow rim and an enlarged head member located at a free end of said bent section;
an elongated center portion extending from said first end;
a second end extending from said center portion; and
a reinforcement member being sized to be received in the hollow rim and being separate from said enlarged head member, said reinforcement member having a first surface, a second surface and a spoke hole, said reinforcement member being located on said bent section of said first end with said enlarged head member engaging said first surface and said second surface of said reinforcement member being adapted to engage a surface of the hollow rim.

37. A bicycle spoke assembly according to claim 36, wherein
said reinforcement member has a first portion with a first maximum circumferential width and a second portion with a second maximum circumferential width that is larger than said first maximum circumferential width.

38. A bicycle spoke assembly according to claim 37, wherein
said first portion of said reinforcement member has a substantially cylindrical outer surface.

39. A bicycle spoke assembly according to claim 38, wherein
said second portion of said reinforcement member has a substantially cylindrical outer surface.

40. A bicycle spoke assembly according to claim 36, wherein
said spoke hole of said reinforcement member is non-circular in transverse cross section.

41. A bicycle spoke assembly according to claim 36, wherein
said first portion has a radial notch adjacent said spoke hole.

42. A bicycle spoke assembly according to claim 36, wherein
said reinforcement member is constructed of a metallic material.

43. A reinforcement member adapted to be positioned between a spoke and a rim with an outer annular surface, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, comprising:
a first portion with a first radial thickness, a first axial thickness and a first maximum circumferential width that is adapted to be received in a spoke opening of the rim;
a second portion that is integrally formed as a one-piece, unitary member with said first portion, said second portion having a second radial thickness larger than said first radial thickness, a second axial thickness larger than said first axial thickness, and a second maximum circumferential width that is larger than said first maximum circumferential width, said second portion having an end surface adapted to engage an end of the spoke; and
a spoke hole extending through said first and second portions, said spoke hole being a through hole sized to receive a portion of the spoke therein.

44. A reinforcement member according to claim 43, wherein
said first portion has a substantially cylindrical outer surface.

45. A reinforcement member according to claim 44, wherein
said second portion has a substantially cylindrical outer surface.

46. A reinforcement member according to claim 43, wherein
said second portion has a substantially cylindrical outer surface.

47. A reinforcement member according to claim 43, wherein
said spoke hole is non-circular in transverse cross section.

48. A reinforcement member according to claim 43, wherein
said reinforcement member is constructed of a metallic material.

49. A reinforcement member adapted to be positioned between a spoke and a rim with an outer annular surface, first and second annular spoke attachment portions coupled to said outer annular surface and located radially inwardly of said outer annular surface and an inner annular surface located radially inwardly of said first and second annular spoke attachment portions and coupling said first and second annular spoke attachment portions together, comprising:
a first portion with a first maximum circumferential width that is adapted to be received in a spoke opening of the rim;
a second portion with a second maximum circumferential width that is larger than said first maximum circumferential width; and
a spoke hole extending through said first and second portions, said spoke hole being sized to receive a portion of the spoke therein, said first portion having a radially extending notch adjacent said spoke hole.

* * * * *